United States Patent [19]

Bolleter et al.

[11] Patent Number: 4,780,066
[45] Date of Patent: Oct. 25, 1988

[54] CENTRIFUGAL PUMP HAVING A MAGNETIC COUPLING

[75] Inventors: Ulrich Bolleter; Erich Kläui, both of Seuzach, Switzerland

[73] Assignee: Sulzer Brothers Limited, Winterthur, Switzerland

[21] Appl. No.: 51,912

[22] Filed: May 19, 1987

[30] Foreign Application Priority Data

Jun. 4, 1986 [CH] Switzerland ............ 2276/86

[51] Int. Cl.⁴ .................................. F04B 17/00
[52] U.S. Cl. ................................. 417/420; 415/10
[58] Field of Search ............. 415/10; 416/3; 417/420; 366/273

[56] References Cited

U.S. PATENT DOCUMENTS

| 3,819,293 | 6/1974 | Zitzmann | 417/420 X |
| 4,065,234 | 12/1977 | Yoshiyuki et al. | 417/420 |
| 4,115,040 | 9/1978 | Knorr | 417/420 |
| 4,207,485 | 6/1980 | Silver | 417/420 X |
| 4,226,574 | 10/1980 | Villette | 417/420 |
| 4,613,289 | 9/1986 | Kotera | 417/420 |
| 4,645,433 | 2/1987 | Hauenstein | 417/420 |

FOREIGN PATENT DOCUMENTS

| 187526 | 11/1966 | U.S.S.R. | 417/420 |
| 914912 | 1/1963 | United Kingdom | 417/420 |

Primary Examiner—Everette A. Powell, Jr.
Attorney, Agent, or Firm—Kenyon & Kenyon

[57] ABSTRACT

The centrifugal pump has a pump rotor unit which is housed within an impeller chamber and which is driven by a permanent magnet coupling having magnetic pole units and pole shoes outside the impeller chamber. The pole shoes define a gap into which an annular part of an end cover of the pump housing projects and into which a magnetizable annular part of the pump rotor unit projects to complete the magnetic flux circuit.

17 Claims, 3 Drawing Sheets 4,780,066

CENTRIFUGAL PUMP HAVING A MAGNETIC COUPLING

This invention relates to a centrifugal pump having a magnetic coupling.

Heretofore, various types of centrifugal pumps known as potted pumps have been provided with drives which rely on permanent magnetic couplings. Generally, the drive is effected through a canned or potted magnetic coupling wherein an outer magnet pot is driven from a motor via a shaft. In other pumps of this kind, also konwn as glandless pumps, the drive is effected directly by means of a potted electric motor with part of a pump rotor unit being formed as a rotor while an outer part of the motor is formed as a stator. Pumps of this type are advantageously used in chemical plants and anywhere where the medium being pumped must not come into contact with the atmosphere or where the materials being pumped are chemically aggressive.

In these known centrifugal pumps, a magnetic pole unit has been disposed in the pump rotor unit chamber and has been connected to the pump rotor as to rotate with the pump rotor. Since the pumped medium flows around the magnetic pole unit, it has been necessary to seal and protect the magnetic pole unit from the pump medium. However, space tends to be narrow and restricted in the pump chamber and the transmission of relatively high power and torque requires the magnetic pole unit to be made from high-grade expensive material in order to genearte adequate field strengths.

Accordingly, it is an object of the invention to provide a permanent agnetic coupling for a centrifugal pump which can be made of inexpensive material.

It is another object of the invention to separate a magnetic pole unit from a medium being pumped in a centrifugal pump without special protective steps being required.

It is another object of the invention to eliminate the need for expensive protective measures in shielding a permanent magnet coupling from a pump rotor unit in a centrifgal pump.

It is another object of the invention to use a relatively inexpensive magnetic pole unit for driving a pump rotor unit of a centrifugal pump.

It is another object of the invention to provide a relatively compact magnetic coupling for driving a pump rotor unit of a centrifugal pump.

Briefly, the invention provides a centrifugal pump which is coprised of a pump rotor unit disposed within an impeller chamber; a permanent magnet coupling for driving the rotor unit and including a pair of magnetic pole shoes outside the impeller chamber and defining an annular gap and a magnetizable part on the rotor unit inside the impeller chamber and within the annular gap to complete a magnetic flux circuit; and a cover between the rotor unit and the pole shoes closing the impeller chamber and having an annular pocket receiving the magnetizable part of the rotor unit.

In one embodiment, the magnetizable part and the pocket in the cover are axially disposed. In this embodiment, the pole shoes are concentric to each other.

In another embodiment, the magnetizable part and the pocket in the cover are radially disposed. In this embodiment, the pole shoes are coaxially disposed.

These and other objects and advantages of the invention will become more apparent from the following detailed description taken in conjunction with the accompanying drawings wherein.

Figure 1:
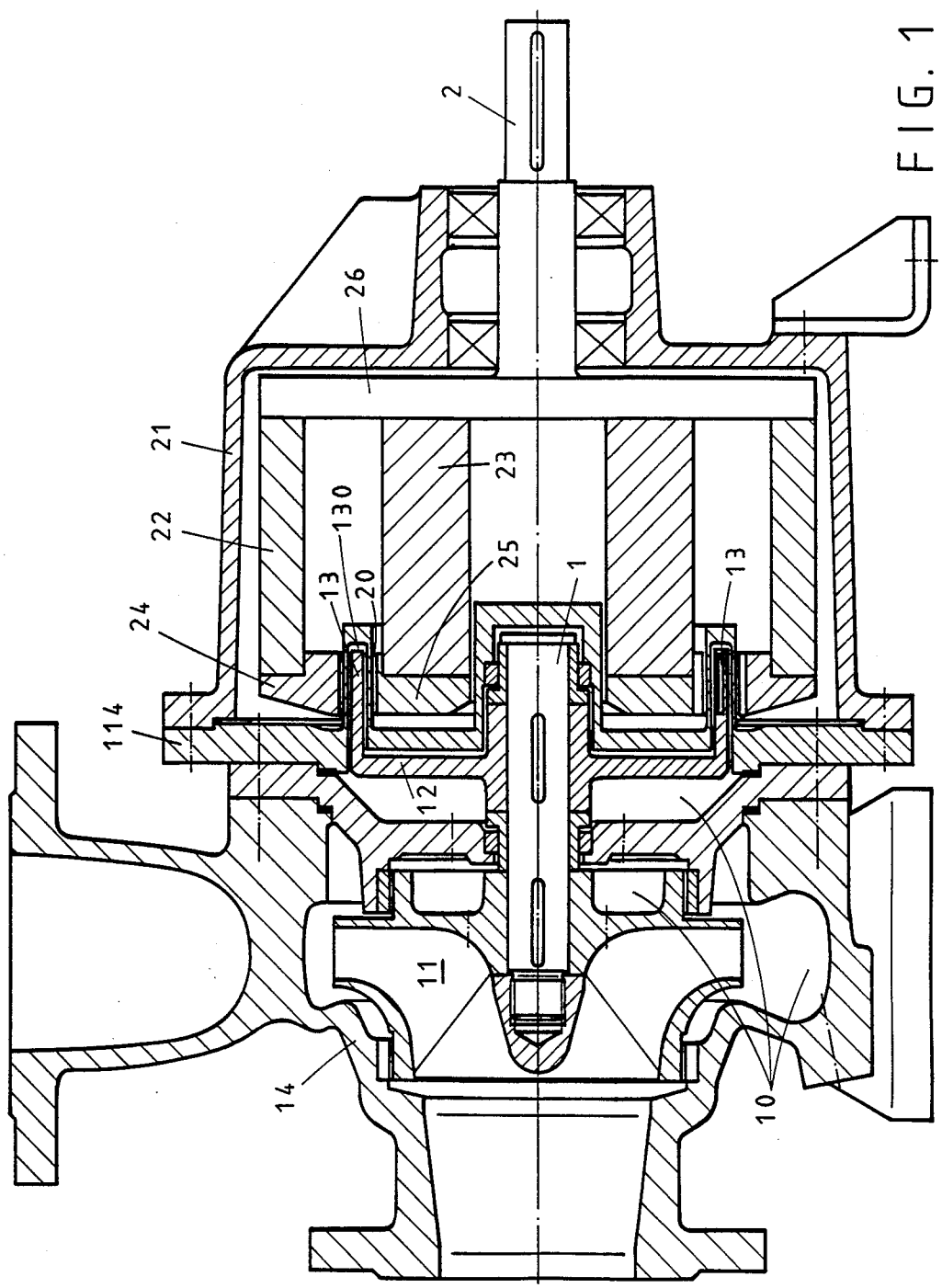
FIG. 1 illustrates a cross sectional view of a centrifugal pump having a magnet coupling in accordance with the invention.

Referring to FIG. 1, the centrifugal pump is of the glandless kind and includes a pump rotor unit which is disposed within an impeller chamber or pump chamber 10. As indicated, the pump rotor unit includes a rotor shaft 1 and an impeller 11 which is mounted on the shaft 1 in a conventional manner so as to be disposed within a pump housing 14 for the pumping of a fluid medium as is known. In addition, a cover 114 is provided to close off the impeller chamber 10.

The pump also includes a drive shaft 2 which is driven by a motor (not shown) and which is rotatably mounted in suitable bearings within a magnetic coupling housing 21 secured to the end cover 114. The drive shaft 2 drives the rotor shaft 1 of the pump rotor unit by means of a permanent magnet coupling.

As illustrated, the permanent magnet coupling includes a pair of magnetic pole units 22, 23 each of which is a permanent magnet consisting of permanent magnet material and mounted on a disc 26, for example of soft iron, which in turn, is secured to the drive shaft 2. The magnetic pole units 22, 23 are in the form of annular pot magnets or a plurality of individual bar magnets which are arranged in an annular array. In addition, the magnet coupling includes a pair of annular pole shoe rings (pole shoes) 24, 25 mounted on the respective magnetic pole units 22, 23 to define an annular gap 20. The magnetic pole units 22 23 and pole shoes 24, 25 are mounted outside the impeller chamber 10 and are separated therefrom by the cover 114.

In order to complete the magnet coupling, a up wheel 12 is mounted on the rotor shaft 1 within the impeller chamber 10 and has a coaxial magnetizable part 13, for example of soft iron projecting axially into the gap 20 between the pole shoes 24, 25. In order to accommodate this projection, the end cover 114 is provided with an annular pocket 130. In this respect, the part of the cover forming the annular pocket 130 is made of a non-magnetizable or a weakly magnetizable material.

The magnetic flux circuit of the coupling thus extends from the magnetic pole units 23 through the soft iron disc 26, the magnetic pole units 22, the pole shoe ring 24, the annular gap 20, the pocket 130, the soft iron part 13 and the pole shoe ring 25 back to the magnetic pole units 23.

Figure 4:
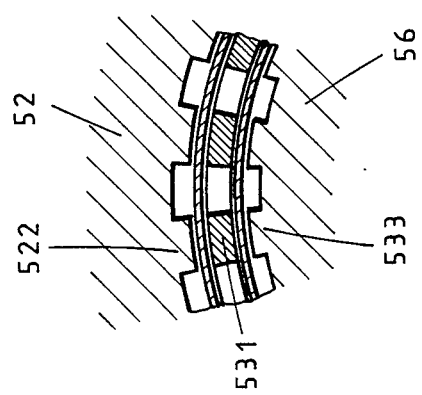
FIG. 4 illustrates a view taken on line I—I of FIG. 3.

In order to obtain optimum power tranmission to the pump rotor unit, the pole shoes 24, 25 and the soft iron part 13 can be provided with a plurality of opposite pole shoes, for example in a manner as indicated in FIG. 4.

If the pump is used for a medium which is chemically aggressive, the soft iron part 13 of the cup wheel 12 may be provided with a corrosion resistant coating, for example, a V-18/8 stainless steel coating. Such a coating is graphically illustrated in the lower part of FIG. 1.

Figure 2:
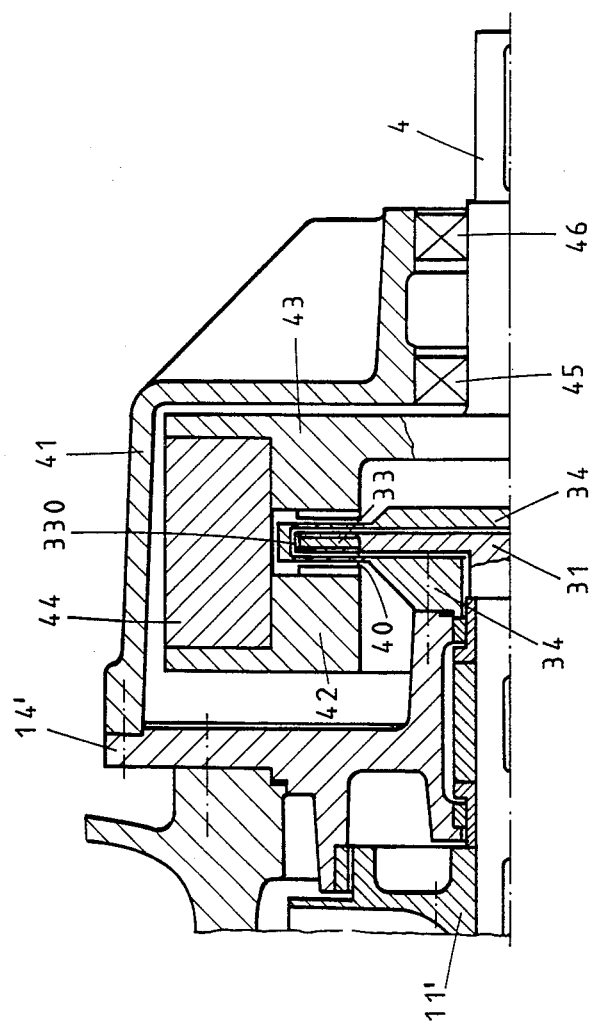
FIG. 2 illustrates a cross sectional view of a centrifugal pump having a modified magnet coupling in accordance with the invention.

Referring to FIG. 2, wherein like reference characters indicate like parts as above, the pump rotor unit may include an impeller 11' and a radially disposed disc 31 which is mounted on a rotor shaft. In addition, the disc 31 is provided with a magnetizable part 33 at the outer part. This magnetizable part which may be made of soft iron projects into an annular U-shaped pocket 330 of an end cover 34 secured to the pump housing 14'.

The permanent magnet coupling includes a pair of coaxially disposed pole shoe rings 42, 43 on opposite sides of the pocket 330 of the end cover 34 in order to form an annular gap 40 therebetween. The pole shoe rings 42, 43 are connected to a common magnet ring 44 which is a permanent magnet and the outermost shoe ring 43 is connected to a drive shaft 4 to act as a disc for the magnetic pole unit. A suitable pot-shaped housing 41 covers the pole rings 42, 43 and rotatably receives the shaft 4 in suitable bearings 45, 46 and acts as a clutch housing.

Figure 3:
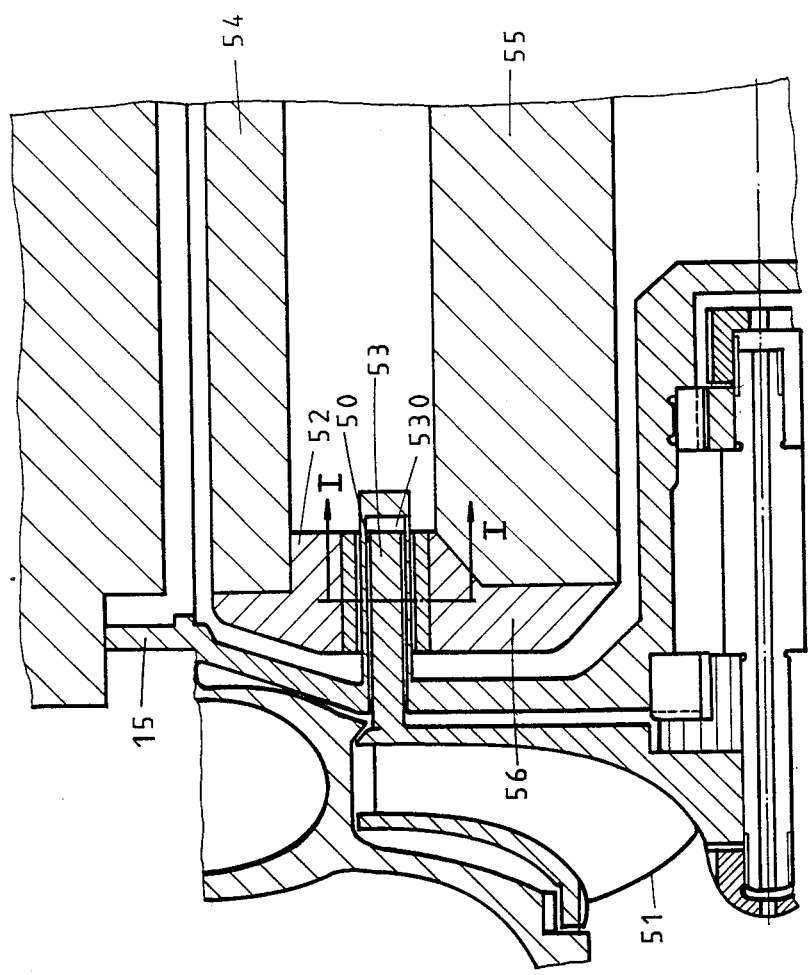
FIG. 3 illustrates a partial cross-sectional view of a centrifugal pump having a further modified magnet coupling in accordance with the invention.

Referring to FIG. 3, the centrifugal pump may be constructed so that the impeller 51 of a pump rotor unit has an annular magnetizable part 53 extending axially therefrom to complete a magnet coupling. In this case, the magnetizable part may be formed of a soft iron and extends into a U-shaped pocket 530 of an end cover 15 of the pump housing and pump chamber. In addition, the magnet coupling includes permanent magnet rings 54, 55 which are connected to annular pole rings 52, 56 defining an annular gap 50 to receive the pocket 530 of the end cover 15 an the magnetizable part. In this case, the magnetic flux circuit extends from the outer magnetic ring 54 through the pole shoe ring 52, a gap 50, part 53, shoe ring 56 and magnetic ring 55 back through a disc (not shown) to the magnetic ring 54.

The magnetic pole unit formed of the magnetic rings 54, 55 and pole shoes 52, 56 is mounted on a shaft (not shown) to be driven by a motor.

In order to guarantee optimum power transmission to the pump rotor unit, the pole shoes 52, 56 and the soft iron part 53 are digitated as indicated in FIG. 4. In this respect, a soft-iron finger 531 on the magnetizable part 53 is disposed between a finger 522 of the outer pole shoe ring 52 and a radially opposite finger 533 of the inner pole shoe ring 53. As indicated, the fingers 531 are arranged in a ring in relation to the magnetizable part 53. In the pumps for chemically aggressive substances, the magnetizable part 53 can be protected by a corrosion resistant coating or other suitable structures such as a sheet metal structure consisting of a non-magnetizable or only weakly-magnetizable material such as stainless steel. Alternatively, use may be made of other protective material such as plastics.

The pole shoe rings 52, 56 may be formed as above, for example from bar magnets.

The above described embodiments are suitable particularly for single-stage pumps having drive powers in the range of from about 20 to 80 kilowatts (kW) where very advantageous results can be obtained economically.

The magnetic materials selected for the various components may be of any suitable type, for example, use may be made of Alnico alloys, ferrites, intermetallic permanent magnetic compounds of rare earths and cobalt or, alternatively, any other permanent magnetic material. The choice of material is governed largely by the space conditions and the magnitude of the power to be transmitted by the magnet coupling.

The invention thus provides a relatively simple permanent magnet coupling for a centrifugal pump wherein the major portion of the coupling can be protected from the medium being pumped.

In particular, the invention provides a permanent magnet coupling in which magnetic pole units can be made of inexpensive material while being diposed outside the pump chamber. In addition, the mass of the pump rotor unit of the centrifugal pump and the surface exposed to the medium being pumped can be reduced with a corresponding reduction in frictional losses. Still further, the pump rotor unit can be made with a lower moment of inertia and, hence, an improved starting behavior as compared to previously known pump rotor units.

What is claimed is:

1. A centrifugal pump comprising
   a pump rotor unit disposed within an impeller chamber;
   a permanent magnet coupling for driving said rotor unit, said coupling including a pair of magnetic pole units outside said impeller chamber and defining an annular gap therebetween and a magnetizable part on said rotor unit inside said impeller chamber and within said annular gap to complete a magnetic flux circuit; and
   a cover between said rotor unit and said pole units closing said impeller chamber and having an annular pocket receiving said magnetizable part of said rotor unit.

2. A centrifugal pump as set forth in claim 1 wherein said rotor unit includes a shaft and a cup-shaped wheel on said shaft and defining said magnetizable part.

3. A centrifugal pump as set forth in claim 1 which further comprises a radially disposed disc having said magnetizable part mounted thereon.

4. A centrifugal pump as set forth in claim 1 wherein said rotor unit includes an impeller having said part extending axially therefrom.

5. A centrifugal pump as set forth in claim 1 which further comprises a corrosion-resistant coating on said magnetizable part.

6. A centrifugal pump as set forth in claim 1 wherein said magnetizable part is made of soft iron.

7. A centrifugal pump as set forth in claim 1 wherein said magnetic coupling includes a plurality of individual bar magnets defining a pair of annular magnetic pole units.

8. A centrifugal pump as set forth in claim 1 wherein said part and said pocket are axially disposed.

9. A centrifugal pump as set forth in claim 1 wherein said part and said pocket are radially disposed.

10. A centrifugal pump comprising
    a pump rotor unit disposed within an impeller chamber;
    a permanent magnet coupling for driving and rotor unit, said coupling including a pair of permanent magnet pole units outside said impeller chamber and defining an annular gap therebetween and a magnetizable part on said rotor unit inside said impeller chamber and within said annular gap to complete a magnetic flux circuit; and
    having an annular pocket receiving said magnetizable part of said rotor unit.

11. A centrifugal pump as set forth in claim 10 wherein said rotor unit includes a shaft and a cup-shaped wheel on said shaft and defining said magnetizable part.

12. A centrifugal pump as set forth in claim 10 wherein said rotor unit includes an impeller having said magnetizable part extending axially therefrom.

13. A centrifugal pump as set forth in claim 10 wherein said magnetizable part is made of soft iron.

14. A centrifugal pump as set forth in claim 10 which further comprises a pair of pole shoe rings mounted on respective pole units to define said annular gap, a disc mounting said pole units thereon and a drive shaft connected to said disc for rotation thereof.

15. A centrifugal pump comprising
 a pump rotor unit disposed within an impeller chamber;
 a permanent magnet coupling for driving said rotor unit, said coupling including a pair of magnetizable pole shoes outside said impeller chamber and defining an annular gap therebetween, a common permanent magnet ring of permanent magnetic material connected to said pole shoes and a magnetizable part on said rotor unit inside said impeller chamber and within said annular gap to complete a magnetic flux circuit; and
 a cover between said rotor unit and said pole shoes closing said impeller chamber and having an annular pocket receiving said magnetizable part of said rotor unit.

16. A centrifugal pump as set forth in claim 15 which further comprises a corosion-resistant coating on said magnetizable part.

17. A centrifugal pump is set forth in claim 15 wherein said magnetizable part is made of soft iron.

* * * * *

UNITED STATES PATENT AND TRADEMARK OFFICE
CERTIFICATE OF CORRECTION

PATENT NO. : 4,780,066

DATED : Oct. 25, 1988

INVENTOR(S) : ULRICH BOLLETER, et al

It is certified that error appears in the above-identified patent and that said Letters Patent is hereby corrected as shown below:

```
Column 1, line 34 "agnetic" should be -magnetic-
Column 1, line 43 "centrifgal" should be -centrifugal-
Column 1, line 51 "coprised" should be -comprised-
Column 2, line 29 "23 each" should be -23, each-
Column 2, line 30 "magnet" (second occurrence) should be
-magnetic-
```

Signed and Sealed this

Second Day of May, 1989

Attest:

DONALD J. QUIGG

Attesting Officer

Commissioner of Patents and Trademarks